Figure 1:
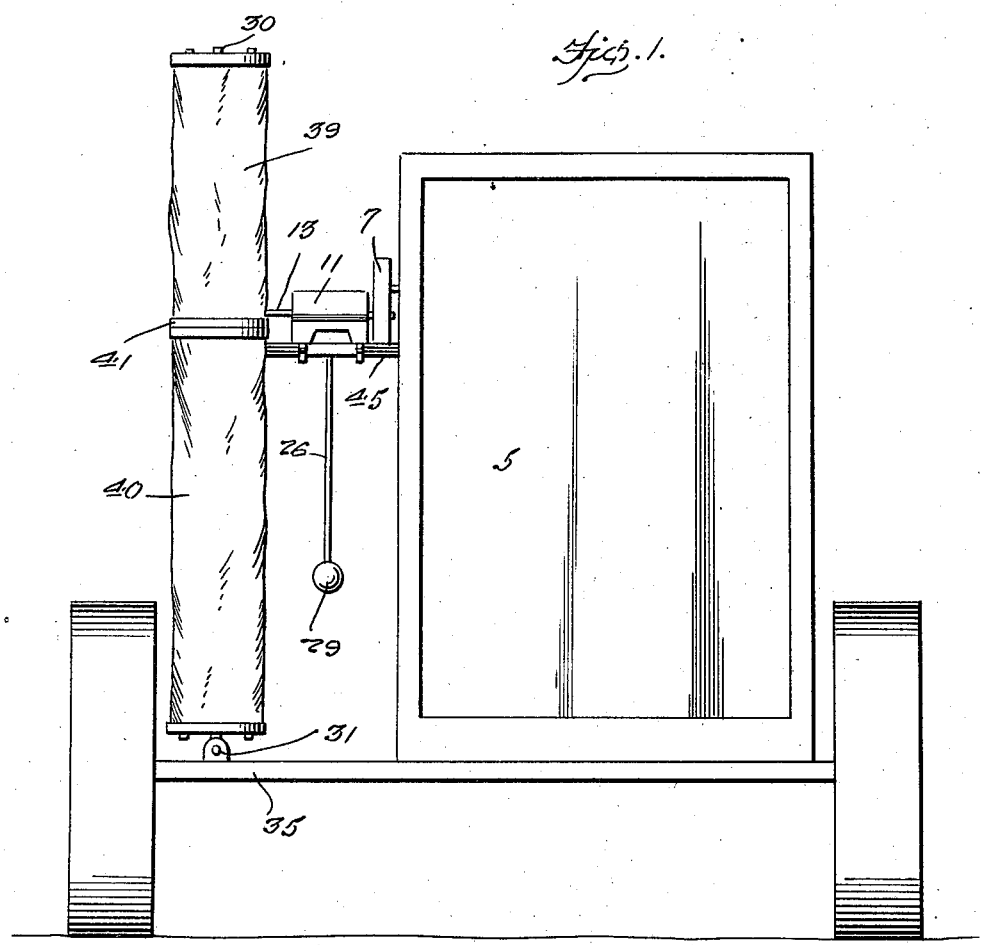

Nov. 19, 1929.  E. BRASCH  1,735,950
ATTACHMENT FOR HARVESTERS
Filed Jan. 11, 1928  3 Sheets-Sheet 1

Inventor
Ernest Brasch

By Clarence A. O'Brien
Attorney

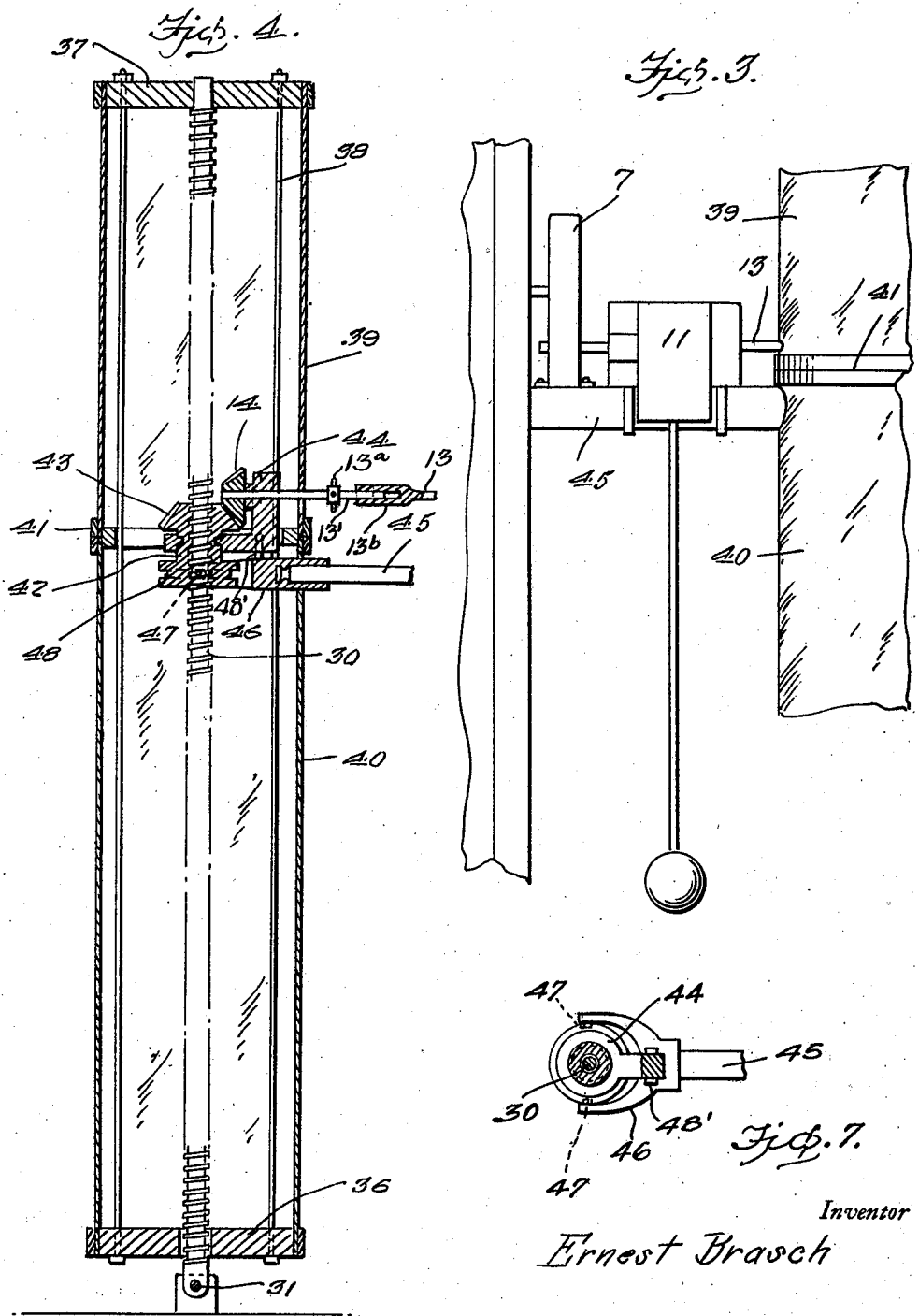

Patented Nov. 19, 1929

1,735,950

UNITED STATES PATENT OFFICE

ERNEST BRASCH, OF NEZPERCE, IDAHO

ATTACHMENT FOR HARVESTERS

Application filed January 11, 1928. Serial No. 246,073.

The present invention relates to combined harvesters and has particular relation to means for keeping the harvester body in a level position, so that when travelling over rough or hilly ground, the body of the machine will be automatically level and the operation of the mechanism facilitated.

Another object of the invention is to provide novel means for accomplishing the above, which is simple and efficient in operation and which may be easily and quickly incorporated as part of the leveling mechanism of a harvesting machine.

With the above and other objects in view, the invention further includes the following novel features and details of construction to be hereinafter more fully described, illustrated in the accompanying drawing and pointed out in the appended claims.

Figure 2:
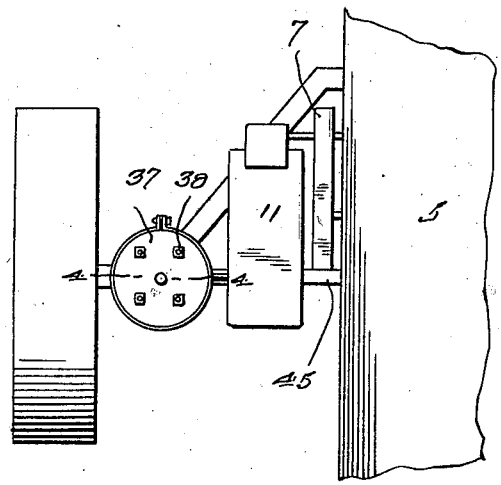
Figure 5:
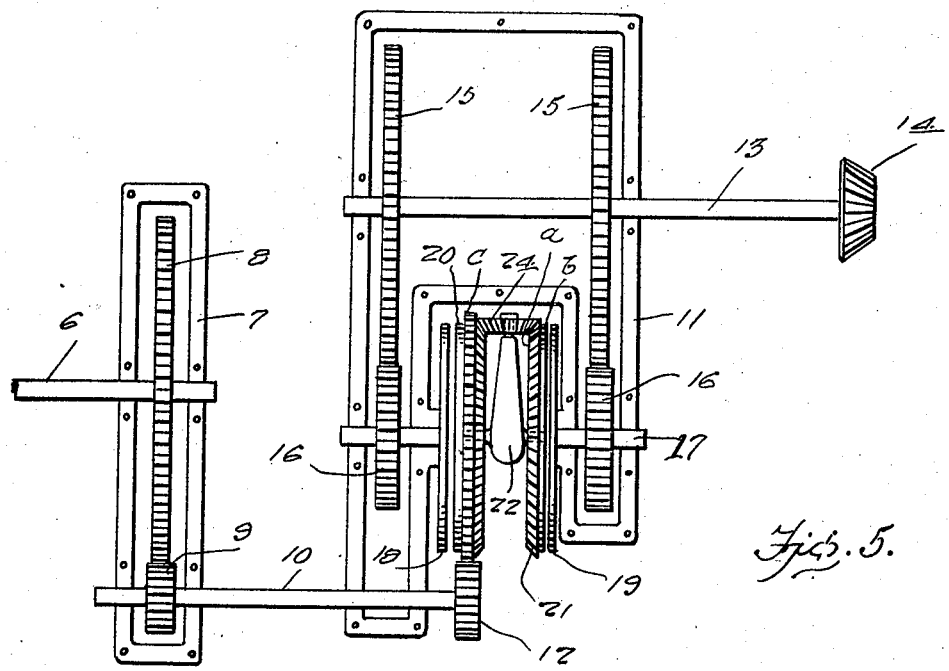
Figure 6:
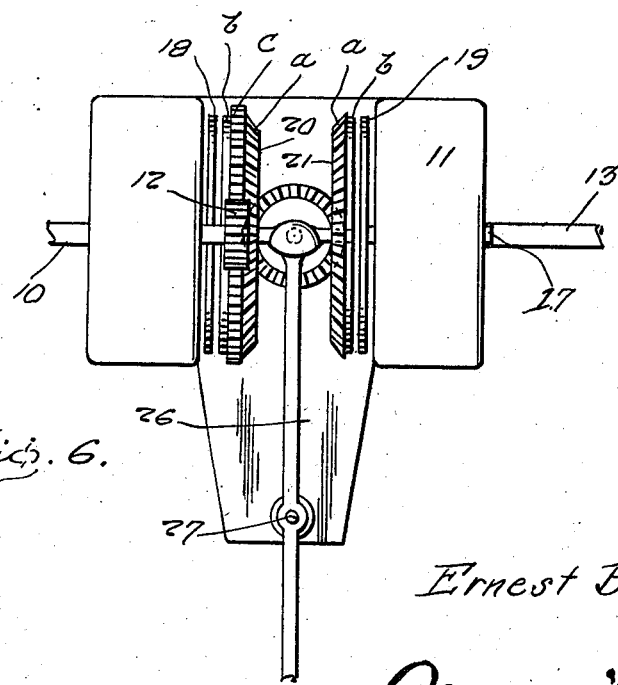

In the drawing:

Figure 1 is a rear view of a separator with my improved construction associated therewith, Figure 2 is a fragmentary top plan view thereof, Figure 3 is a fragmentary front elevation, thereof, Figure 4 is a vertical section taken substantially on the line 4—4 of Figure 2, Figure 5 is a detail sectional view showing the gearing, Figure 6 is an end elevation thereof, and Figure 7 is a horizontal sectional view through the attachment.

Referring to the drawing in detail it will be seen that the numeral 5 denotes a separator having a shaft 6 projecting therefrom and operated by the drum thereof and journaled in a gear casing 7. A gear 8 is fixed on the shaft 6 within the casing 7 and meshes with a pinion 9 on a shaft 10 journaled in the casing and extending therefrom to a gear casing 11. A pinion 12 is on the other end of the shaft 10. The housing 11 has a shaft 13 journaled therethrough and the exterior end thereof is provided with a beveled pinion 14. A pair of gears 15 are rigid on the shaft 13 within the casing 11 and mesh with pinions 16 on a shaft 17 journaled in the casing 11. Clutch disks 18 and 19 are mounted on the shaft 12. Gears 20 and 21 are loose on the shaft 7 and each comprises a beveled gear portion $a$ and a clutch face portion $b$. The gear 20 further includes a crown gear portion $c$. A head 22 has journaled thereon a pinion 24 meshing with the beveled gear portion $a$ of gears 20 and 21. The pinion 12 meshes with the crown gear portion $c$ so that the gears 20 and 21 and the pinion 24 are in constant rotation. A pendulum shank 26 is fulcrumed intermediate its ends as at 27 and has a heavy weight on the lower extremity thereof as at 29. A screw threaded bar 30 is pivotally engaged as at 31 on the frame 35 and has a mooring 36 through which it extends and a second mooring 37 in which the upper end thereof is disposed. Tie rods 38 connect the moorings 36 and 37. Cylindrical canvas covers 39 and 40 extend respectively toward each other from moorings 37 and 36 and are connected together at their inner ends by suitable means 41. A nut member 42 is threaded on the bar 30 and has a beveled gear portion 43 meshing with pinion 14 which is journaled through a bracket 44 on the arm 45. This bracket 44 has extension 46 with inwardly directed pins 47 extending into a grooved collar 48 formed on the nut member 42.

Now if the combined harvester were going along a hillside that slanted to the right, the combine is slanting in the same direction within the incentive or pendulum lever 26 to swing away from the combine's separator in an attempt to keep itself adjusted parallel with alined force gravity. This action brings the whirling clutch 20 over in contact with clutch plate 18 thus setting the system of gears in motion causing the nut member 42 in turning to climb the smooth bar 30 and since the separator fastens to it to arm 45 it is carried out of the tilt to a position of level. When this point is reached, the ball and pendulum lever keeping itself adjusted parallel with the force of gravity, takes the whirling clutch out of contact. If the combine should happen to lead to the left just the opposite would occur as will be apparent by considering the engagement of clutch 21 with clutch 19 as the gears would thus be revolved in a reverse direction and the nut member would move down on the screw bar.

It is thought that the construction, operation and advantages of the invention will now be quite apparent to those skilled in this art without a more detailed description thereof.

The present embodiment of the invention has been disclosed in detail merely by way of example since in actual practice it attains the features of its advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. An attachment of the class described comprising, in combination, an arm of a separator, a shaft rotatable by the separator, a screw threaded bar for pivotally mounting the lower end of the bar on the frame of the separator; a nut member threaded on the bar, a gear formed on the bar, a gear in mesh with the first mentioned gear, a shaft extending from the second gear, clutch actuated gearing for rotating the shaft in either direction, pendulum means for controlling the clutch of the mechanism, gearing connected to the mechanism with the first mentioned shaft, said nut member having a collar and means on the arm engaging the collar so that the arm will be swung as the collar raises and lowers on the bar.

2. An attachment of the class described comprising, in combination, an arm of a separator, a shaft rotatable by the separator, a screw threaded bar for pivotally mounting the lower end of the bar on the frame of the separator, a nut member threaded on the bar, a gear formed on the bar, a gear in mesh with the first mentioned gear, a shaft extending from the second gear, clutch actuated gearing for rotating the shaft in either direction, pendulum means for controlling the clutch of the mechanism, gearing connected to the mechanism with the first mentioned shaft, said nut member having a collar and means on the arm engaging the collar so that the arm will be swung as the collar raises and lowers on the bar, said mechanism comprising a pair of gears on the second shaft, a third shaft, fingers on the third shaft meshing with the pair of gears, combined gear and clutch elements on the shaft last mentioned, clutch disks passed on the last shaft mentioned, a pendulum pivotally mounted and having a head with a pinion journaled thereon meshing with the last mentioned gears for shifting them into engagement with the clutch disk to rotate the gears in the proper direction.

In testimony whereof I affix my signature.

ERNEST BRASCH.